Nov. 25, 1969  A. B. GOUGH  3,480,772
LUMINAIRE
Filed March 9, 1967  6 Sheets-Sheet 4

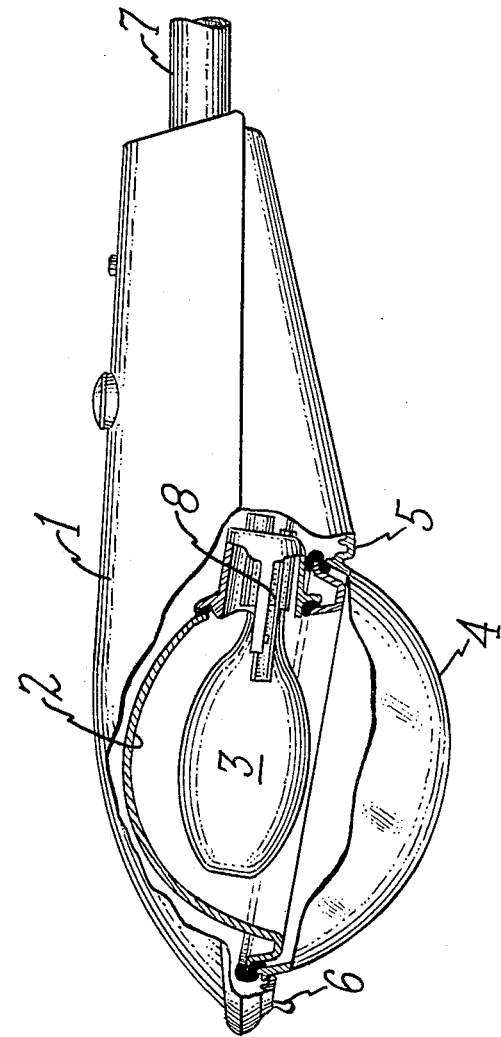

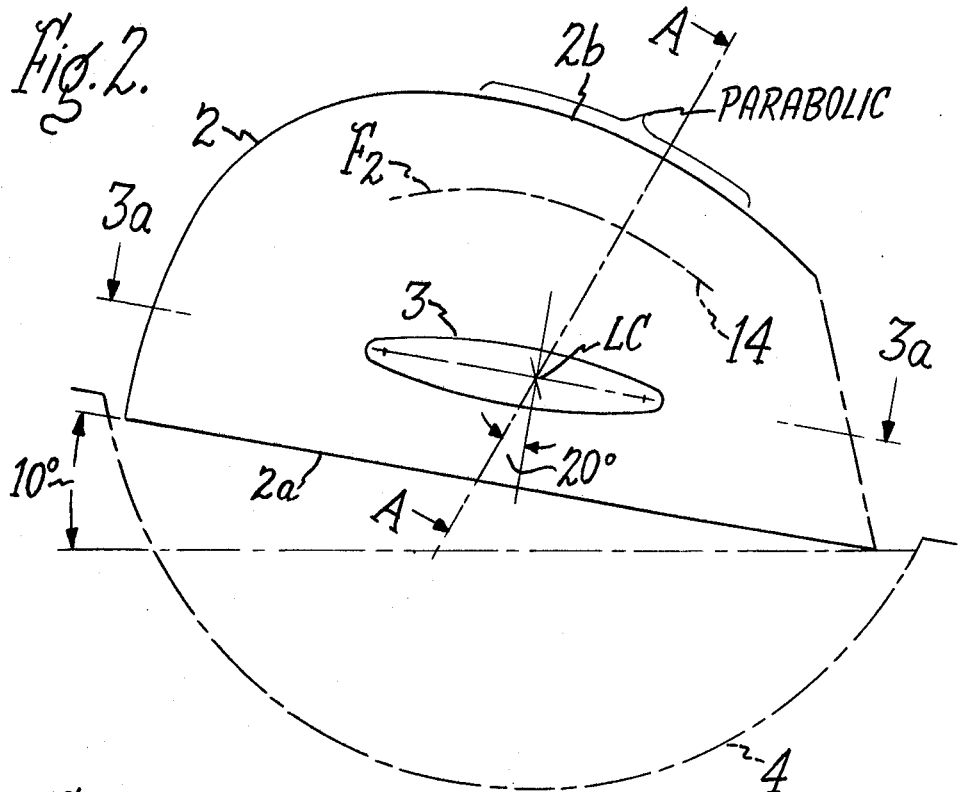
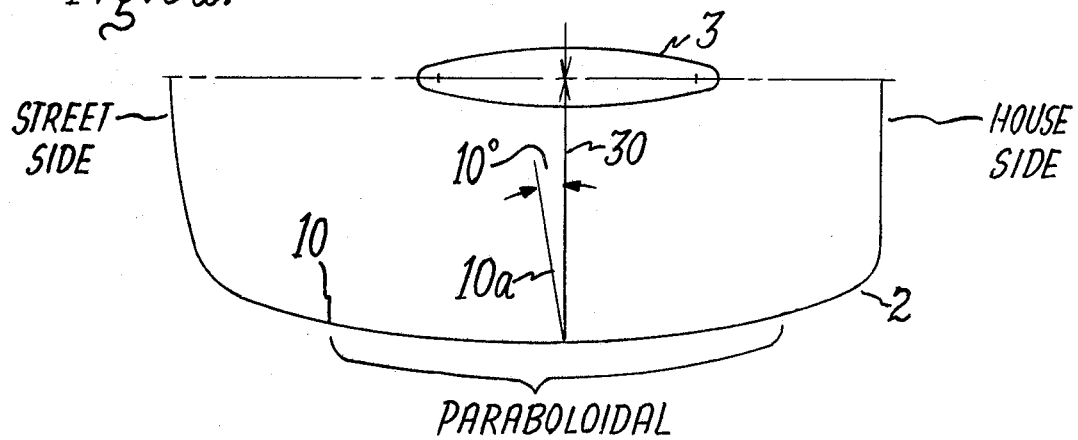

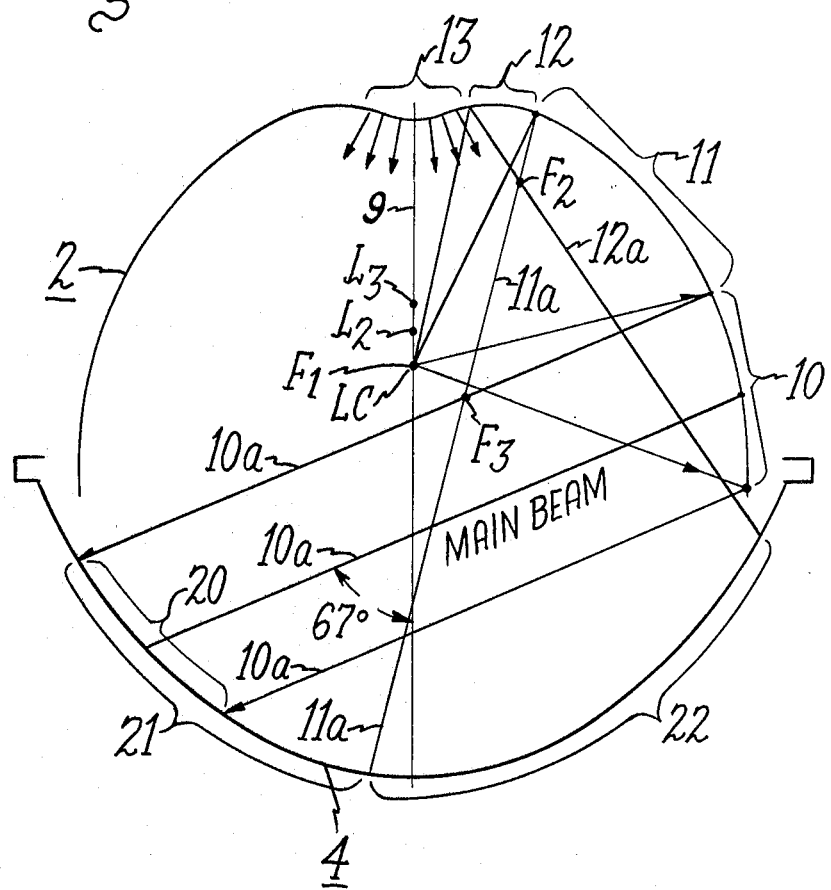

HOUSE SIDE  STREET SIDE

Inventor,
Alfred B. Gough,
by Sidney Greenberg
His Attorney.

Nov. 25, 1969   A. B. GOUGH   3,480,772
LUMINAIRE

Filed March 9, 1967   6 Sheets-Sheet 5

HOUSE SIDE   STREET SIDE

Inventor,
Alfred B. Gough,
by Sidney Greenberg
His Attorney.

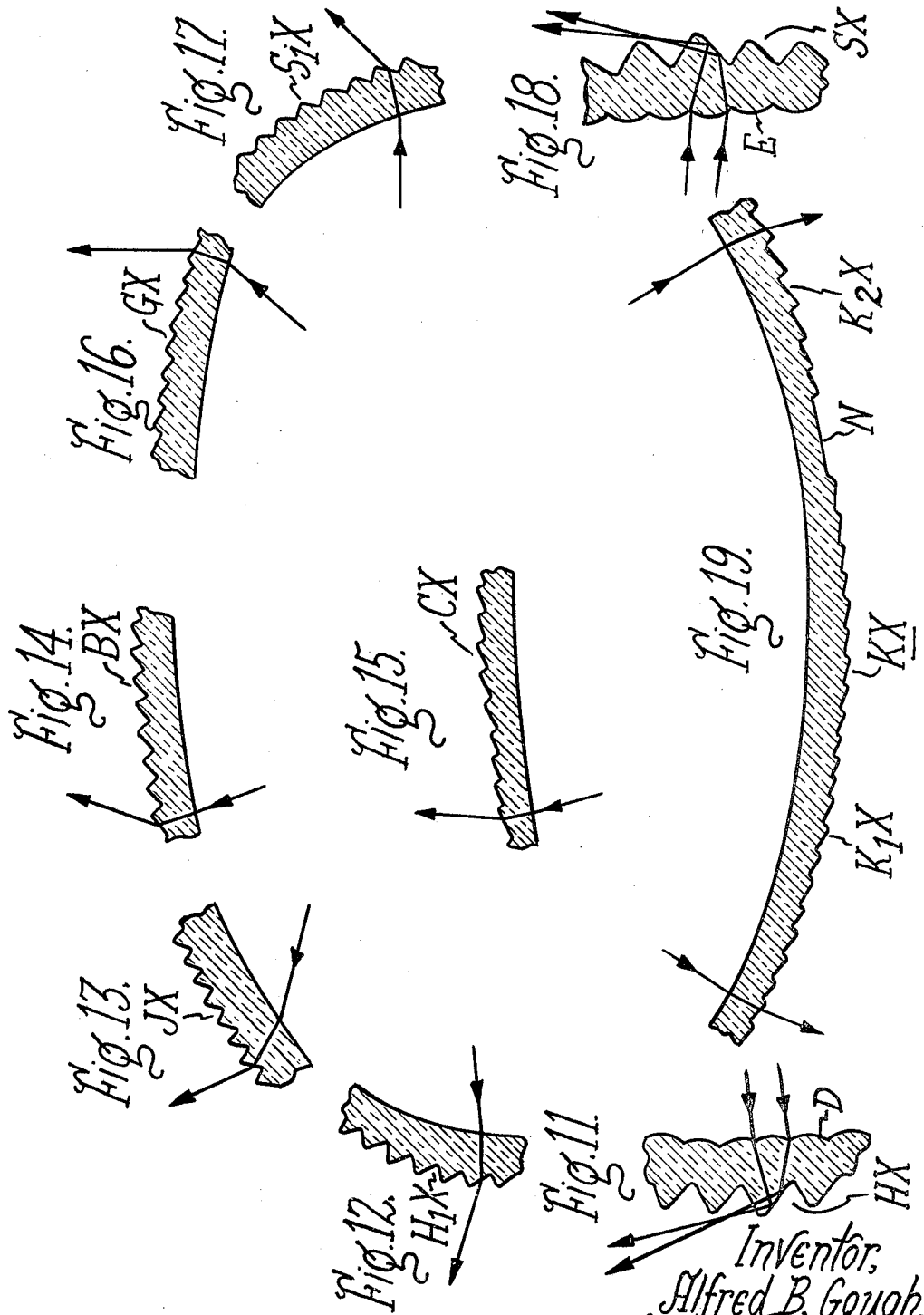

United States Patent Office 3,480,772
Patented Nov. 25, 1969

3,480,772
LUMINAIRE
Alfred B. Gough, Flat Rock, N.C., assignor to General Electric Company, a corporation of New York
Filed Mar. 9, 1967, Ser. No. 621,968
Int. Cl. F21s *1/10, 3/10, 13/10*
U.S. Cl. 240—25        11 Claims

ABSTRACT OF THE DISCLOSURE

Street lighting luminaire comprises a reflector formed with a combination of two parabolic-elliptical surfaces and a paraboloidal surface for reflecting light from a light source located at principal foci of the reflecting surfaces. The reflector is combined with a refractor which coacts therewith to lift the light rays and re-direct them in desired directions along the street. The conjugate foci of the parabolic-elliptical surfaces are arranged in loci outside the region of the light source at points which result in distribution of light uniformly on the refractor.

---

It is a general object of the invention to provide a street lighting luminaire which is characterized by improved optical performance resulting from better light control of light received from the light source, especially one of elongated type, whereby the available light may be more effectively utilized and placed in desired distribution on the roadway surface.

It is a particular object of the invention to provide an improved reflector for street lighting luminaires of the above description wherein the reflector provides a relatively high angle of lift for the main reflected light beams, while providing for substantial illumination of all parts of the refractor.

Another particular object of the invention is to provide a reflector of the above-described type which avoids overheating of the lamp by reflected light rays.

It is still another object of the invention to provide an improved refractor which, in combination with a reflector of the above-described type, results in improved utilization, efficiency and uniformity of light distribution by the luminaire on the roadway, and has a prismatic structure which facilitates manufacture of the refractor.

Other objects and advantages will become apparent from the following description and the appended claims.

With the above objects in view, the present invention in one of its aspects relates to a luminaire comprising a generally ovate reflector having a longitudinal axis and an open bottom defined by a rim lying in a plane, an elongated light source arranged within the reflector in a position extending generally along the longitudinal axis and having a light center, the reflector having reflecting surface areas on opposite sides of the light source, each reflecting surface area comprising a paraboloidal surface portion extending upwardly a substantial distance from the rim, a first elliptical surface portion adjoining and extending upwardly from the paraboloidal surface portion, and a second elliptical surface portion at the top of the reflector adjoining the first elliptical surface portion, the focus of the paraboloidal surface portion and principal foci of the first and second elliptical surface portions being substantially coincident with one another and with the light center, the axis of the paraboloidal surface portion sloping downwardly for reflecting light rays from the light source in a substantially parallel beam passing outwardly through the open bottom of the reflector, the conjugate focus of the first elliptical surface portion being located substantially on the uppermost ray of the parallel reflected beam, the light from the light source being reflected by the first elliptical surface portion in a beam of light rays which intersect substantially at the conjugate focus thereof, and the conjugate focus of the second elliptical portion being located substantially on the uppermost ray of the light beam reflected by the first elliptical portion.

The invention further relates to the combination with the above-described reflector of a bowl-shaped generally ovate refractor having prismatic internal and external surface portion for controlling and distributing in desired manner reflected light received from the reflector and direct light received from the light source.

The invention will be better understood from the following description taken in conjunction with the accompanying drawings, in which:

FIGURE 1 is a view in elevation, partly broken away, of a street lighting luminaire in which the invention may be embodied;

FIGURE 2 is a diagrammatic longitudinal view of the reflector-refractor combination of the FIGURE 1 luminaire;

FIGURE 3 is a diagrammatic transverse view of the reflector-refractor combination taken along the line A—A of FIGURE 2;

FIGURE 3a is a diagrammatic view of a longitudinal section of the reflector taken along the line 3a—3a of FIGURE 2;

FIGURES 11–19, inclusive, are detailed views in cross-section of various portions of the refractor showing the external prisms and ray diagrams relating thereto.

Figure 4:
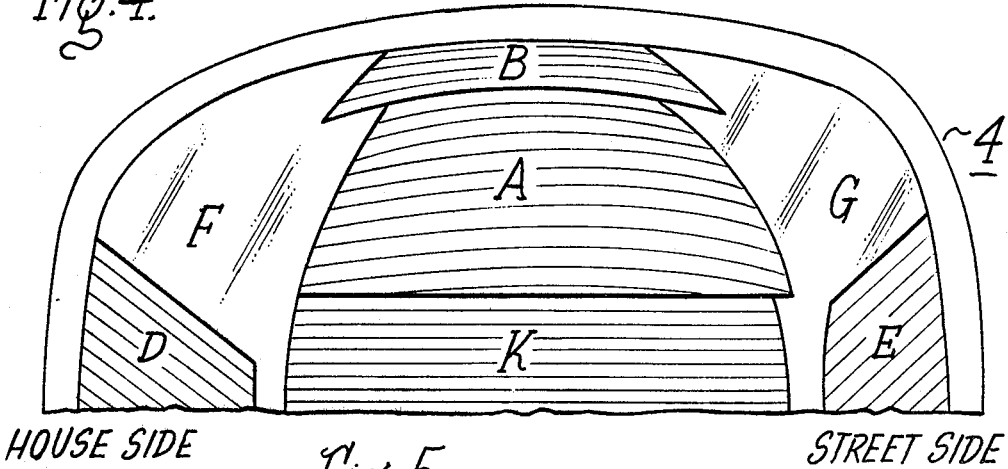
FIGURES 4 and 5 are respectively top plan and internal side views of the refractor showing the arrangement of internal prisms thereof.

Referring now to the drawings, and particularly to FIGURE 1, there is shown a street lighting luminaire comprising a housing 1 in which is located reflector 2 and elongated lamp 3. Reflector 2, which is generally ovate in shape, is detachably secured within housing 1 and is closed at its open bottom by a generally ovate bowl-shaped transparent refractor 4 which is mounted in a frame 5 hingedly connected at its rear end to housing 1 and detachably secured at its front end to housing 1 by latch 6. At its rear end, housing 1 is provided with a suitable bracket or slipfitter (not shown) for mounting the luminaire on the end of a pipe support 7 or the like, whereby the luminaire may be mounted at the side of a roadway to be illuminated. As seen in the diagrammatic view of FIGURE 2, the luminaire is typically mounted so that the plane of reflector rim 2a is tilted toward the street side at an angle of about 10° to the horizontal, and lamp 3 having a light center LC is arranged with its longitudinal axis extending generally parallel with the plane of rim 2a and the longitudinal axis of the reflector. Reflector 2 has a generally parabolic contour in longitudinal planes, as indicated by the bracketed top portion 2b in FIGURE 2 and as shown in FIGURE 3a.

FIGURE 3 is a diagrammatic view of the transverse section of the reflector-refractor combination taken along the line A—A of FIGURE 2, the section being at 20° to to the transverse plane normal to the reflector rim and passing through the light center LC. Reflector 2 has a paraboloidal lower portion 10 which extends upwardly a substantial distance from the reflector rim, a parabolic-elliptical upper side portion 11, and a parabolic-elliptical top portion 12; both latter surfaces being referred to herein simply as "elliptical." Elliptical portions 11 and 12 and paraboloidal portion 10 are contiguous to one another and form a smooth continuous surface from top to bottom of the reflector. The reflector being symmetrical on opposite sides of the longitudinal vertical median plane 9 (see FIGURE 3), it will be understood that the described contours characterize the other side of the reflector as well. The arrangement of the contoured portions and their curvature are such, in accordance with the invention, that the focus of paraboloidal portion 10 and the principal foci of elliptical portions 11 and 12 are all located on the axis of the light source, and in the transverse section represented by FIGURE 3, all these foci, designated $F_1$, are at the light center LC. In other transverse sections parallel to section A—A, it will be understood that the principal foci of corresponding elliptical portions 11 and 12 will also coincide with one another and with the focus of paraboloidal portion 10 at LC. The paraboloidal portion 10 is arranged with its optical axis downwardly sloping, so that light received from light center LC is reflected downwardly in a main beam of parallel rays 10a which pass outwardly from the mouth of reflector 2 and strike the side portion 20 of refractor 4. Paraboloidal portion 10 is so oriented that main beam 10a slopes downwardly at an angle of about 63°–69°, typically about 67°, from the nadir, and as seen in FIGURE 3a main beam 10a is angled typically about 10° toward the street side (front end) from the transverse axis 30 of the reflector. The latter angle may vary, however, in the range of about 0° to 30°.

Conjugate focus $F_3$ of elliptical surface portion 11 (see FIGURE 3) is arranged to lie on the uppermost ray reflected by paraboloidal portion 10 and at a point between the latter portion and the lamp axis, so that light received from the lamp is reflected by elliptical portion 11 in light rays which intersect at conjugate focus $F_3$ and of which thereafter the uppermost ray generally coincides with the uppermost ray reflected from paraboloidal portion 10. The arrangement is such that the light distributed by the elliptical portion 11 is in the zone 21 of refractor 4 which extends from the uppermost ray of the main beam 10a to and partially into the keel prism area of the refractor described hereinafter. As seen in FIGURE 3, the light ray 11a which defines the lower limit of the light beam distributed by elliptical portion 11 also is the light ray which is reflected by the uppermost end of elliptical portion 11.

Conjugate focus $F_2$ of the top elliptical portion 12 is arranged to lie on light ray 11a at a point between the lamp axis and elliptical portion 11, so that light received from the lamp is reflected by elliptical portion 12 in light rays which intersect at focus $F_2$ and of which the ray at one extreme coincides with ray 11a, and ray 12a at the other extreme strikes refractor 4 just below the rim of reflector 2. As a result, the light distributed by elliptical portion 12 is in the zone 22 extending from the lower limit of the rays distributed by elliptical portion 11 to a point on the refractor adjacent the reflector rim, in other words, in the refractor zone not covered by light rays from the paraboloidal portion 10 and elliptical portion 11 on that side of the reflector. The light thus distributed by elliptical portion 12 provides full-flashing of the refractor in that zone, that is, avoids the darkened appearance which would otherwise be observed in that region and avoids that intensified light from the direct rays of the lamp on the keel portion of the refractor which would otherwise be apparent.

At the top central region, reflector 2 is formed with an indented surface portion which is smoothly contiguous to the elliptical surfaces at each side thereof and which provides an inwardly convex surface 13 of hyperbolic contour. Light received from lamp 3 is accordingly reflected by surface 13 in diverging rays on opposite sides of the lamp, thereby avoiding undue heating of the lamp by passage of reflected light rays therethrough. Other convex contours, such as cylindrical, parabolic or the like, could be used in place of the hyperbolic form, if desired.

As seen from the side view in FIGURE 2, the conjugate focus $F_2$ of the various elliptical surfaces 12 along the length of reflector 2 fall on a curved line in space or locus 14 which is located above and to the side of lamp 3. Such an arrangement avoids the risk of overheating the lamp which would otherwise exist if these foci were located in the lamp region. Similarly, the foci $F_3$ of the various elliptical surfaces 11 along the length of the reflector form a locus spaced substantially away from the lamp region, as will be evident from the location of $F_3$ shown in FIGURE 3.

Reflector 2 being symmetrical on opposite sides of a vertical longitudinal median plane represented by median line 9 in FIGURE 3, the contoured reflecting surfaces on the opposite side of the reflector will produce a light distribution corresponding to that produced by surfaces 10, 11 and 12 as described above. As a result, the refractor is provided with substantially uniform illumination throughout its surface regions, and further light control by the refractor to distribute the thus received light rays into a desired pattern on the roadway is readily and efficiently achieved by the refractor structure described hereinafter.

With lamp 3 arranged in the position designated $F_1$ in FIGURE 3, it provides a relatively high beam distribution, that is, the rim of the reflector cuts off the light at a relatively high angle as measured from the nadir. For the purpose of producing a low beam distribution, lamp 3 may be moved vertically upward, as well understood in the art. When the lamp is moved to such higher positions $L_2$ or $L_3$, the rays therefrom are reflected in the same general manner as previously described, the difference being mainly that the rays reflected from elliptical surfaces 11 and 12 will not intersect precisely at their respective conjugate foci $F_3$ and $F_2$ but in the general vicinity thereof, and the rays reflected by paraboloidal surface 10 will not be precisely parallel but approximately so. Nevertheless, the zones of distribution of light on refractor 4 by the respective reflecting surfaces as described previously with the lamp in the lower position will still be generally the same.

With lamp 3 at position $L_2$, the main beam reflected from paraboloidal portion 10 will have an angle of about 60°–64° from the nadir, and with lamp 3 at position $L_3$ the main beam will have an angle of about 55°–59°.

In the embodiment illustrated in FIGURE 1, lamp 3 is mounted in support means 8 which may be re-positioned for the purpose of shifting the lamp in a vertical direction relative to reflector 2. This adjustable mounting means and its operation are more fully described in copending application Ser. No. 530,213—Franklin et al., filed Feb. 25, 1966, now Patent No. 3,348,035 and assigned to the same assignee as the present invention. It will be obvious that other types of lamp mounting means for providing vertical shifting of the light source could be used, if desired.

While the angle of the transverse section A—A of FIGURE 2 has been described as being 20° to a transverse plane normal to the reflector rim in the illustrated embodiment, it will be understood that this angle may vary in the range of about 0°–30°, depending on the angle at which it is desired to direct the emitted light beam toward the street.

Figure 5:
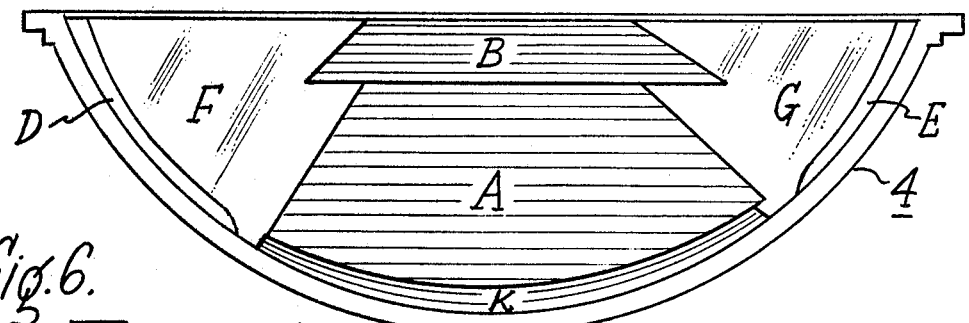

FIGURE 4 shows a top plan view of the interior of one-half of refractor 4 on one side of a vertical longitudinal median plane, and FIGURE 5 shows the refractor interior as viewed from the side. Since the refractor is symmetrical on both sides of this median plane, the other side will have a corresponding refracting structure as shown and described. As seen from FIGURES 4 and 5, a major part of the interior side wall is occupied by prism Sector A which is located to receive the main beam reflected from paraboloidal portion 10 of the reflector.

Figure 6:
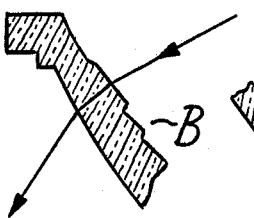
FIGURES 6, 7 and 8 are detailed views in cross-section of various portions of the refractor showing the internal prisms and ray diagrams relating thereto.
Figure 7:
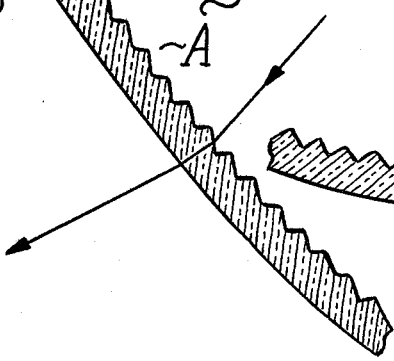
Figure 8:
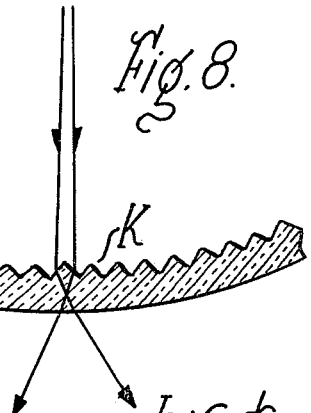

Sector A is constituted by rows of parallel prisms extending in a slight arc generally along the longitudinal axis of refractor 4, the prisms being formed and arranged to lift the received light rays approximately 8° as they are refracted and transmitted outwardly by the refractor (see FIGURE 7), so that the final angle of these rays is about 75° from the nadir. Above Sector A is located Sector B which receives direct light from the light source and depresses it to approximately the angle at which the main beam is emitted from Sector A (see FIGURE 6). Sector K in the internal keel portion of the refractor is occupied by longitudinally parallel rows of prisms which receive direct light from the lamp and uniformly disperse it on the street in the area below the luminaire (see FIGURE 8).

Sectors D and E at the house and street ends, respectively, are occupied by parallel rows of flutes or internal collecting crowns (see FIGURES 11 and 18) which are angularly arranged with respect to similar flutes on the opposite side of the longitudinal median plane and which register with external reflecting prisms as hereinafter described for laterally re-directing light from the light source.

Sectors F and G are smooth transitional interior surfaces at the corners of the refractor.

Figure 9:
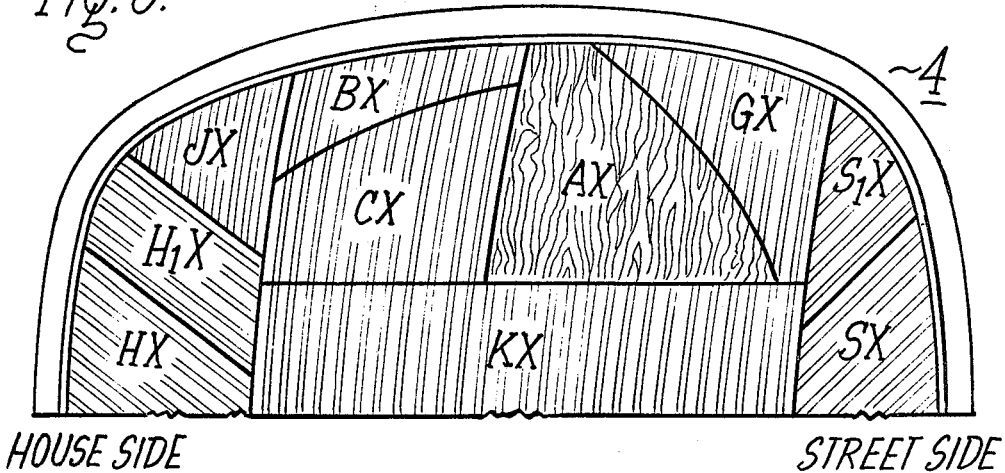
FIGURES 9 and 10 are respectively bottom plan and side views of the refractor showing the arrangement of external prisms thereof.
Figure 10:
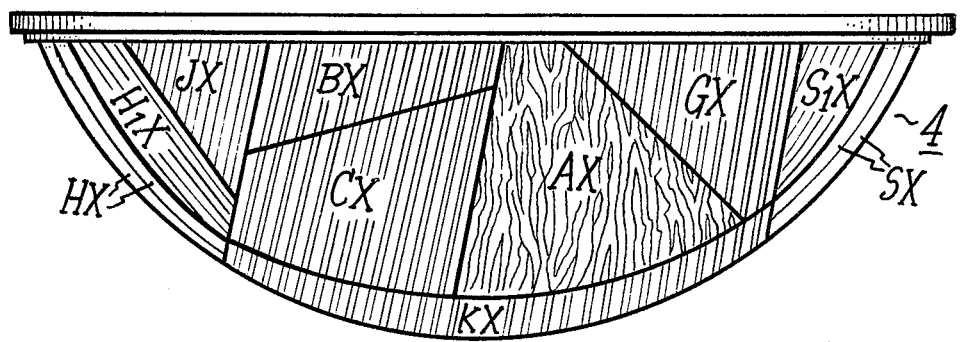

FIGURES 9 and 10 are respectively bottom plan and side views of the refractor, showing the arrangement of external prisms on the refractor surface. Sector HX at the house end of the refractor and Sector SX at the street end comprise combination reflecting-refracting prisms, and serve to laterally re-direct the light striking these ends of the refractor as shown in FIGURES 11 and 18. These prisms are opposite the internal convex (collecting) flutes or crowns in Sectors D and E as described previously, and are so formed that the light emanates from each prism at a large angle without striking the next adjacent prism. This structure forms the subject matter of co-pending application Ser. No. 135,659—Rex and Brom, filed Sept. 1, 1961, now Patent No. 3,398,273 and assigned to the same assignee as the present invention, and the disclosure of that application, so far as that subject matter is concerned, is incorporated herein by reference.

Sector AX is constituted by ripples for diffusion of light received from internal Sector A.

Sectors BX and CX are vertical house-side external prisms for laterally re-directing the received light rays as seen in FIGURES 14 and 15. Sector BX receives direct light and Sector CX receives both direct and reflected light.

Sector GX is comprised of vertical rows of prisms on the street side for laterally re-directing light rays, as shown in FIGURE 16.

Sector $S_1X$ is similarly constituted by vertical rows of prisms and is, in effect, an extension of Sector GX for the purpose of lateral re-direction of light passing through the street end of the refractor, as seen in FIGURE 17. Sector $S_1X$ provides a smooth transition from the action of Sector GX prisms to that of Sector SX prisms.

Sectors $H_1X$ and JX are, in effect extensions of Sectors BX and CX for the purpose of lateral re-direction of light rays falling thereon. FIGURES 12 and 13 shows such lateral re-direction with respect to Sector $H_1X$ and JX prisms respectively.

The external keel region of the refractor is comprised of Sector KX. This Sector, which serves to depress downwardly toward the street light received in this region, is formed of two prism portions $K_1X$ and $K_2X$, as seen in FIGURE 19. Portions $K_1X$ and $K_2X$ are formed of parallel rows of prisms extending transversely of the longitudinal axis of the refractor, the two portions being divided at null point N and having diminishing refracting power from their respective outer ends to the point N, as indicated in FIGURE 19. As will be noted, the prism arrangements in Sectors BX, CX and KX are such that the rows of prisms are aligned with one another. This feature affords easier and more economical manufacture of the refractor, as well as providing smoother transition of the light ray distribution effected by the different Sectors.

Although a refractor of particular structure has been described for use in combination with the particular reflector disclosed, it will be understood that the reflector may be used in combination with other types of refractors, or may in appropriate cases be used without any refractor associated therewith.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A luminaire comprising, in combination, a generally ovate reflector having a longitudinal axis and having an open bottom defined by a rim lying in a plane, an elongated light source arranged within said reflector in a position extending generally along said longitudinal axis and having a light center, the reflector having reflecting surface areas on opposite sides of the light source, each reflecting surface area comprising in contiguous continuous relation a paraboloidal surface portion extending upwardly a substantial distance from said rim, a first elliptical surface portion adjoining and extending upwardly from said paraboloidal surface portion, and a second elliptical surface portion at the top of said reflector adjoining said first elliptical surface portion, the focus of said paraboloidal surface portion and principal foci of said first and second elliptical surface portions being substantially coincident with one another and with said light center, the axis of said paraboloidal surface portion sloping downwardly for reflecting light rays from said light source in a substantially parallel beam passing outwardly through the open bottom of said reflector, the conjugate focus of said first elliptical surface portion being located substantially on the uppermost ray of said parallel reflected beam, the light from said light source being reflected by said first elliptical surface portion in a beam of light rays which intersect substantially at said conjugate focus thereof, and the conjugate focus of said second elliptical surface portion being located substantially on the uppermost ray of the light beam reflected by said first elliptical surface portion.

2. A luminaire as defined in claim 1, said first and second elliptical surface portions being generally parabolic along the length of said reflector and each having a plurality of conjugate foci lying in respective loci located outside the space occupied by said light source.

3. A luminaire as defined in claim 2, the locus of the conjugate foci of said second elliptical surface portion being located generally between said light source and the top of said reflector.

4. A luminaire as defined in claim 3, the locus of the conjugate foci of said first elliptical surface portion being located generally between said light source and said paraboloidal surface portion.

5. A luminaire as defined in claim 4, the top central portion reflector being formed with an inwardly convex reflecting surface for reflecting direct light from said light source away from the latter.

6. A luminaire as defined in claim 1, including means for moving said light source to a predetermined position above said first mentioned position for providing an emitted light beam with lower angle than that resulting from said first mentioned position.

7. A luminaire as defined in claim 1, said axis of said paraboloidal surface, and thereby said parallel beam reflected therefrom, being angled upwardly about 65°–69° from the nadir.

8. A luminaire as defined in claim 2, the plane of a transverse section of said reflector containing corresponding principal and conjugate foci of said first and second elliptical surface portions being angled at about 0°–30° to a transverse plane normal to the plane of said reflector rim.

9. A luminaire as defined in claim 8, said reflector having opposite front and rear ends, said axis of said paraboloidal surface being oriented toward the front end at about 0°–30° to said transverse plane.

10. A luminaire as defined in claim 1, a bowl-shaped generally ovate refractor arranged closing the bottom of said reflector, said refractor having a bottom keel region, upper opposite side regions, and intermediate opposite side regions located between and adjoining said keel region and the respective upper side regions, each paraboloidal reflector surface portion reflecting said parallel beam onto the opposite intermediate refractor side region, said first elliptical reflector surface portion reflecting a light beam onto the opposite intermediate refractor side region and a part of said keel region, and said second elliptical reflector surface portion reflecting a light beam onto substantially the remaining regions of said refractor lying between the lowermost beam from said first elliptical surface portion and said reflector rim.

11. A luminaire as defined in claim 10, said upper, intermediate and keel regions of said refractor having aligned prism portions on the exterior surface thereof for laterally re-directing the light rays received thereon from said light source.

References Cited
UNITED STATES PATENTS

| | | | |
|---|---|---|---|
| 2,739,226 | 3/1956 | Rex | 240—25 |
| 3,160,350 | 12/1964 | Rex et al. | 240—25 XR |
| 3,219,812 | 11/1965 | Turner | 240—44.2 XR |

NORTON ANSHER, Primary Examiner

R. P. GREINER, Assistant Examiner

U.S. Cl. X.R.

240—103